June 14, 1938.  J. F. SPELLACY ET AL  2,120,314
SLAB TURNING APPARATUS
Filed May 20, 1937  2 Sheets-Sheet 1

INVENTORS
JOHN F. SPELLACY &
THOMAS L. BURRELL
BY John N. Kennard,
their ATTORNEY.

June 14, 1938.    J. F. SPELLACY ET AL    2,120,314
SLAB TURNING APPARATUS
Filed May 20, 1937    2 Sheets-Sheet 2

INVENTORS
JOHN F. SPELLACY &
THOMAS L. BURRELL
BY
ATTORNEY.

Patented June 14, 1938

2,120,314

UNITED STATES PATENT OFFICE 2,120,314

SLAB TURNING APPARATUS

John F. Spellacy, Fairview Village, and Thomas L. Burrell, Cleveland, Ohio

Application May 20, 1937, Serial No. 143,803

1 Claim. (Cl. 198—33)

This invention relates to a slab clamping and turning apparatus for turning steel or ferrous slabs for cross rolling. In the manufacture of steel strip and bar stock, the usual practice is to pass the cropped and heated ingot or steel slab to a suitable scale breaking mill or reduction mill, the slab passing to the mill endwise or crosswise, as desired, along conveyors, such as suitably driven conveying rolls or chains, to a transfer table. Such a table is usually a large and expensive hydraulically hoisted platform which lifts the slab clear of the conveyor, rotates it 90° about a vertical axis, and re-deposits it on the conveyors so that it enters the mill at 90° to its original position. For example, the slab may pass through the first mill sidewise and before it is passed through the succeeding mill, it is turned endwise, whereupon it is again turned sidewise preparatory to entry into the third mill, this action continuing until the slab has been reduced to a predetermined size and shape. Not only are the transfer tables employed very expensive, but also they are comparatively slow in operation, requiring a temporary stopping of the travel slab during its rotation to its new position.

One of the principal objects of the present invention is to provide a new and improved means for effecting this turning or rotation of the slab during its passage from one mill to the next.

A more specific object is to provide a clamp which may be used in connection with the conventional transfer rolls and guides and which automatically engages and causes the desired rotation and re-positioning of the slab without any appreciable cessation in its rate of travel.

Other objects and advantages will become apparent from the following specification wherein reference is made to the drawings, in which.

Figure 1:
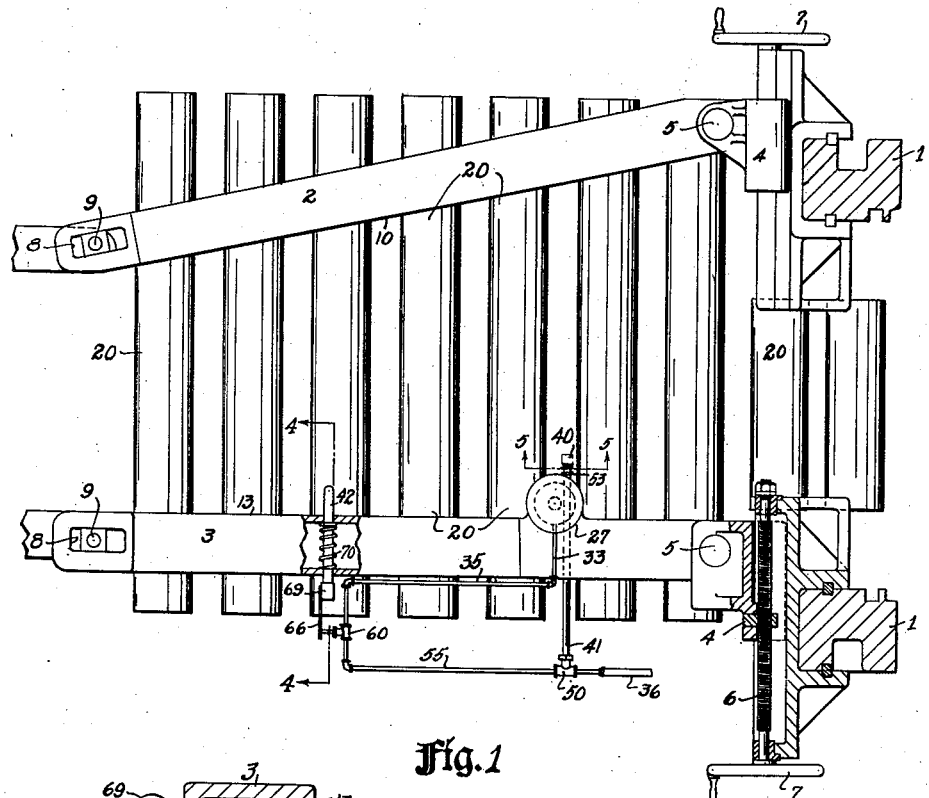
Fig. 1 is a horizontal plan view of the discharge end of one mill and the conveying rolls leading to the next mill, showing the invention installed for use in connection therewith, part thereof being shown in section for clearness in illustration.
Figure 4:
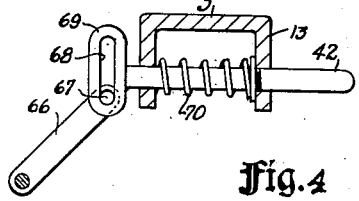
Figure 5:
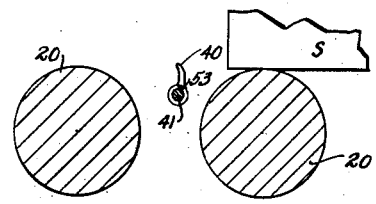
Figure 6:
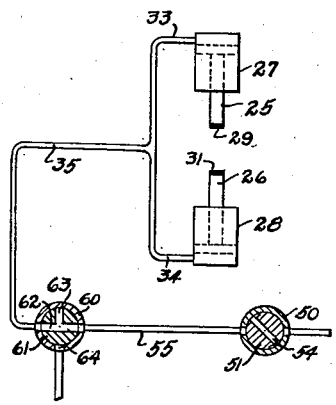
Figure 2:
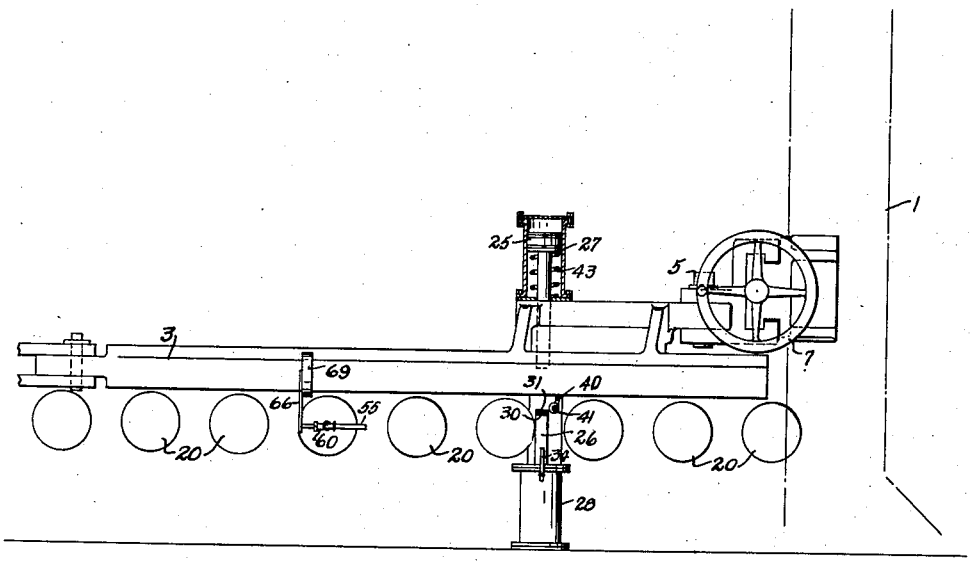
Fig. 2 is a side elevation of the structure illustrated in Fig. 1.
Figure 7:
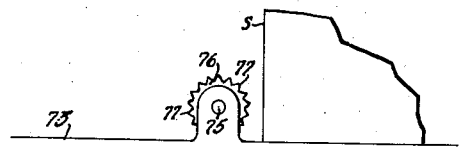

Figs. 4 and 5 are fragmentary vertical sectional views taken on lines 4—4 and 5—5, respectively, of Fig. 1;

Fig. 6 is a diagrammatic illustration of part of the apparatus showing the automatic fluid pressure control and operating circuit; and Fig. 7 illustrates a modification of the invention.

Referring to the drawings, the upright columns of the frame of the rolling mill from which the slab is being delivered are indicated at 1. Connected to the frame members 1 are laterally adjustable longitudinally extending guides 2 and 3, respectively, for guiding the slab into a succeeding mill. Each of the guides 2 and 3 is provided at the end adjacent the first mill with a suitable worm follower 4 which is pivotally connected to the end of the guide by a pivot 5. The worm follower operates on a suitable screw 6 which is mounted on the frame 1 of the mill for rotation about a horizontal laterally extending axis and may be rotated by a suitable hand wheel 7 for moving the follower 4 laterally of the mill. The opposite end of each guide is provided with a longitudinal slot 8 in which slides a pivot 9 fastened to the frame of the succeeding mill, the longitudinal slot compensating for the difference between the swinging radius of the guide and the chordal path of the follower 4. Both guides have upright guide surfaces, such as the surface indicated at 10 on the guide 2, the guide surfaces extending longitudinally of the path of travel of the slab. However, in the case of the guide surface of the guide 3, the relatively leading portion 11 is offset outwardly from the plane of the relatively trailing guide surface portion 13 thereof, for purposes later to be described. Below the level of the guides 2 and 3 are conveying rolls 20 which may be continuously driven so as to transport the slab issuing from the mill 1 to the succeeding mill.

At a distance beyond the mill 1, at least slightly greater than the maximum length of the slab to issue therefrom, is the clamping mechanism with which the present invention is particularly concerned. This mechanism may comprise a pair of hydraulically or pneumatically operated pistons 25 and 26 which are aligned axially with each other and arranged one above and one below the path of the slab. The pistons 25 and 26 are mounted in hydraulic or pneumatic cylinders 27 and 28 so as to be driven relatively toward each other by fluid pressure. The cylinders 27 and 28 are preferably carried on the guide 3 so as to operate in the proper relation thereto in all adjusted positions of the guide 3.

Carried on the bottom end of the piston 25 is a gripping shoe 29 which may be rotatable about its own axis and the axis of the piston on suitable ball bearings 30. Correspondingly, a gripping shoe 31 is provided on the piston 26. The shoes 29 and 31 are preferably slightly convex and arcuate or spherical on their gripping faces so that substantially only point contact with the slab is effected.

The cylinders 27 and 28 are connected to a suitable source of fluid under pressure, such as pneumatic pressure, which is readily available in steel mills, the cylinders being connected in parallel to the fluid pressure circuit by suitable pipe lines 33, 34 and 35, to which fluid pressure is supplied from a flexible hose line 36 through valves later to be described.

The shoes 29 and 31 are so arranged that the leading corner of the slab nearest the guide 3 will pass therebetween. At the instant of such passage, the pressure fluid is introduced into the cylinders 27 and 28 and forces the pistons into gripping relation with the opposite faces of the slab adjacent the corner. Since the cylinders 27 and 28 are interconnected in the fluid pressure circuit, the pistons will accommodate themselves to the thickness of the particular slab and will not lift it from the rolls 20 or force it too tightly thereagainst. Thus, the gripping or clamping mechanism floats vertically and is self adjusting for the thickness of the particular slab.

With the slab gripped in this manner, the continuous driving of the rolls 20 causes it to begin swinging about its clamped corner, that is, about the common axis of the pistons 25 and 26, and to continue to do so until the leading corner which was originally directly opposite from the gripped corner, transversely of the path of travel of the slab, has swung around and engaged the trailing guide surface portion 13 of the guide 3. This swinging or turning action thereby disposes parallel to the trailing portion 13 of the guide 3 that edge of the slab which was originally the leading edge or side. In this position the slab may be released, the desired turning having been accomplished without appreciably interrupting the travel of the slab. The device may be operated by hand by the operator if desired, but automatic control is preferred.

As one example of automatic control, a suitable rock lever or wiper 40 is fixedly mounted on a rock shaft 41 which is carried on the guide 3. The wiper 40 extends from beneath the top plane of the conveying rolls 20 thereabove and into a position to be engaged by the slab, indicated as S in Figs. 3 and 5, and rocked the proper amount when the corner of the slab is in the proper position between the shoes 29 and 31 to cause the shoes to clamp the slab.

The wiper 40 operates a means, later to be described, such that, when the wiper is rocked by the slab, the source of fluid pressure is connected to the cylinders 27 and 28 and remains connected as long as the wiper is held in the rocked position. For releasing the slab after it has been turned, a plunger 42 is mounted in the portion 13 of the guide 3 in a position to be engaged and moved laterally of the guide portion 13 when the leading edge or side of the slab has been swung alongside the guide. The plunger 42 operates a means for disconnecting the cylinders 27 and 28 from the source of fluid pressure and venting them to the atmosphere or to a suitable sump. Return springs 43 may be used for restoring the pistons 25 and 26 to starting position when the fluid pressure is relieved for restoring the shoes 29 and 31 to non-gripping position. Obviously, if desired, the gripping action may be effected by the springs and the return action by the fluid pressure mechanism.

Figure 3:
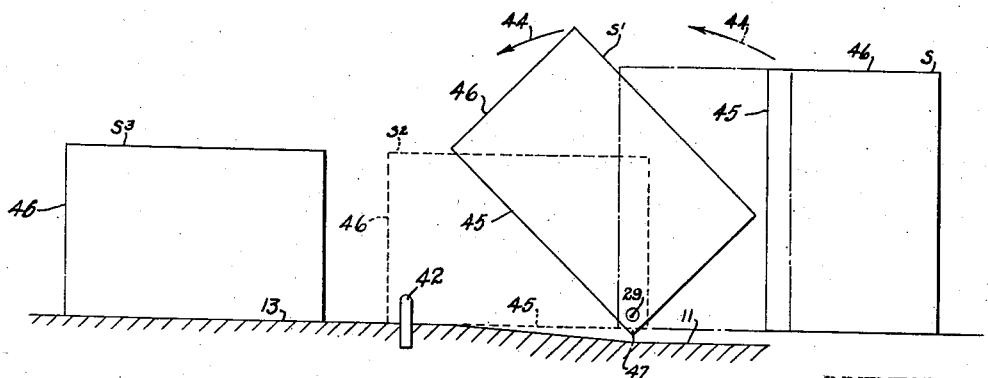
Fig. 3 is a diagrammatic illustration of successive operations of the apparatus.

Referring next to Fig. 3, the turning operation is diagrammatically illustrated. In such instance the slab S is moving sidewise from right to left. When it passes between the clamping shoes 29 and 31, it is gripped near one corner and begins swinging, as indicated by the arrow 44, one swinging position of the slab being indicated at $S_1$. It continues swinging around the axis of the pistons until it reaches a position indicated by the dotted line $S_2$, in which instance its leading edge 45 lies alongside the trailing guide portion 13. In this position it is released and continues moving in the new position, indicated at $S_3$, wherein what was originally the leading edge lies along the guide and the side edge 46 becomes the leading edge. It is to be noted that clearance must be allowed for the relative passage of the corner 47 of the slab during its rotation or turning. For this reason the leading guide portion 11 is offset from the trailing portion 13 as heretofore described.

The slab ordinarily is discharged from the mill onto the conveying rolls a few inches out from the guide 3 and is not required to be guided until the turning operation begins. If such guiding is required, only the portion of the guide portion 11 adjacent the clamping mechanism would be offset to permit relative passage of the corner 47 during rotation of the slab.

In order to render the fluid pressure operated pistons automatic, as heretofore mentioned, the rock shaft 41 is connected to the stem of a valve 50 for rotating the valve plug 51 thereof when the wiper 40 is rocked by the ingot or slab S. A suitable coil return spring 53 is provided in surrounding relation to the shaft 41 for restoring the wiper 40 and consequently the valve plug 51, to starting position when the slab passes out of engagement with the wiper 40. As better illustrated in Fig. 6, the valve plug 51 is provided with a single transverse passage 54 which, when the valve plug is rotated by the slab through the medium of the wiper 40, connects the pipe line 55 with a source of fluid under pressure, not shown, and when the valve is restored to its starting position by the spring 53, disconnects the line 55 from the source of fluid pressure. The wiper 40 is positioned so that when the ingot is in proper position to be gripped by the shoes 29 and 31, the wiper will open the valve 50.

Connected in the line 55 between the valve and the line 35 which leads to the cylinders is a valve 60 having a valve plug 61 which is provided with a diametrical duct 62 and a bleeder duct 63 communicating with the duct 62 and extending substantially at right angles thereto. The valve plug 61 is so arranged that it normally occupies a position wherein the duct 62 connects the lines 35 and 55. The casing of the valve is provided with a bleeder vent 64 arranged so that when the valve plug 61 is rotated sufficiently to block the line 55 leading from the valve 50, the line 35, leading from the valve 60 to the cylinders, is connected with the vent 64 through the ducts 62 and 63. The valve plug 61 has an operating handle 66 having at one end an operating pin 67 which operates in a slot 68 in a yoke portion 69 of a releasing plunger 42. The plunger 42 at its inner end normally extends from the guide 3 into the path of travel of the slab and, as heretofore explained, is moved outwardly from the guide when engaged by the slab when the slab is rotated or turned to the position for release. A suitable spring 70 normally holds the plunger 42 in the extended position, in which position the plunger operates the valve 60 for opening the line 55. Upon retraction of the plunger by engagement with the ingot, the valve plug 61 is rotated to stop the flow of fluid pressure from the valve 50 and to connect the cylinders with the bleeder vent 64, thus releasing the pneumatic or fluid pressure, whereupon the plungers 25 and 26 release the slab.

As diagrammatically illustrated in Fig. 6, the control circuit is in normally inoperative position, the lines 35 and 55 being disconnected from the source of fluid pressure by the valve 50 and the plungers 25 and 26 being in withdrawn or non-clamping position. As the slab strikes the wiper 40, the valve 50 is opened and fluid under pressure passes through the line 55, the valve 60, and the line 35 into both cylinders 27 and 28 for operating the same to grip the slab. This pressure is maintained until the slab strikes the plunger 42 and turns the valve plug 61 so as to disconnect the cylinders from the source of air under pressure and connect them through the duct 63 and duct 62 with the bleeder vent 64. In this position of the valve plug 61, the springs of the cylinders return the cylinders to a non-gripping position and the slab is released. This position of the valve plug 61 is maintained as the slab travels a short distance along its path of travel in its turned position and until it has released the wiper 40 which has meanwhile been depressed. During this period, obviously the only loss of air or liquid is that which was originally in the cylinders. Upon continued movement of the slab, the wiper 40 is released and disconnects the line 55 from the source of fluid pressure, the valve plug 51 returning to its starting position, as illustrated. Upon additional movement of the slab, the plunger 42 is released and the spring 70 then restores the plunger 42 and valve plug 61 to a position connecting the lines 55 and 35 so that the circuit is ready for repetition of the cycle.

It is apparent from the foregoing description that the apparatus may readily be installed for use in connection with the existing mill equipment and effects the operation of turning the slab without appreciably interrupting the travel thereof.

If instead of the mechanism above described, a simpler though less positive apparatus for this purpose is desired, the structure illustrated in Fig. 7 may be used. As illustrated, there is provided in a guide 73, similar to the guide 3, instead of the plungers 25 and 26, a pivot 75. The pivot 75 depends below its support on the guide 73 a distance sufficient to lie in a path of the slab so that the leading edge of the slab adjacent the corner nearest to the guide 73 will strike the pivot 75 and, being obstructed at such corner, will be rotated or swung about the pivot by the conveying rolls until the slab is disposed at right angles to its original position. It happens, however, that at times the pivot does not hold the slab sufficiently securely after it has swung about 60° from its position of engagement therewith. On the contrary, the slab often slides off the pivot and becomes skewed relative to its path of travel and enters the succeeding mill in improper position. In order to eliminate this disadvantage, however, the pivot is constrained from rotation and is provided with a suitable disk 76 having peripherally disposed, radially extending teeth 77. When the teeth of the disk engage the leading edge of the slab near the corner, they tend to dig slightly into the slab and thus prevent the slab from sliding off of the pivot laterally of the path of travel until the slab has been turned substantially 90° to its succeeding position.

Having thus described our invention,

We claim:

In an apparatus for the purposes described, continuously driven means for effecting travel of a slab of material along a predetermined lineal path, a stationary member extending into the path of a leading corner portion of the slab and having a toothed surface engageable with said corner portion for causing the slab to swing about said portion to a new rotated position.

JOHN F. SPELLACY.
THOMAS L. BURRELL.